July 9, 1940.  W. D. CORLETT  2,207,535

VALVE TAPPET AND INSERT

Original Filed Dec. 14, 1938

INVENTOR.
Webster D. Corlett
BY
ATTORNEY.

Patented July 9, 1940

2,207,535

UNITED STATES PATENT OFFICE 2,207,535

VALVE TAPPET AND INSERT

Webster D. Corlett, Oak Park, Ill., assignor to Standard Screw Company, Hartford, Conn., a corporation of New Jersey Original application December 14, 1938, Serial No. 245,619. Divided and this application April 28, 1939, Serial No. 270,505

5 Claims. (Cl. 123—90)

My invention relates to an improvement in valve tappet adjusting devices and has for one purpose the provision of a self-locking valve tappet adjusting screw in which the screw may be set to its desired position without the employment of any separate or external lock nut.

Another purpose is the provision of an adjusting device which has a constant torque or friction when once assembled, and which will remain constant throughout the life of the tappet.

Another purpose is the provision of locking means in which the locking action is procured by a downward pull of the thread, which keeps the lower flanks of the thread on the tappet adjusting screw in contact with the upper flanks of the thread in the tappet, in the same direction as that of the blows of the cam.

Other purposes will appear from time to time in the course of the specification and claims.

This is a division of my co-pending application Serial No. 245,619 filed on December 14, 1938.

I illustrate my invention more or less diagrammatically in the accompanying drawing wherein.

Like parts are indicated by like characters throughout the specification and drawing.

Figure 1:
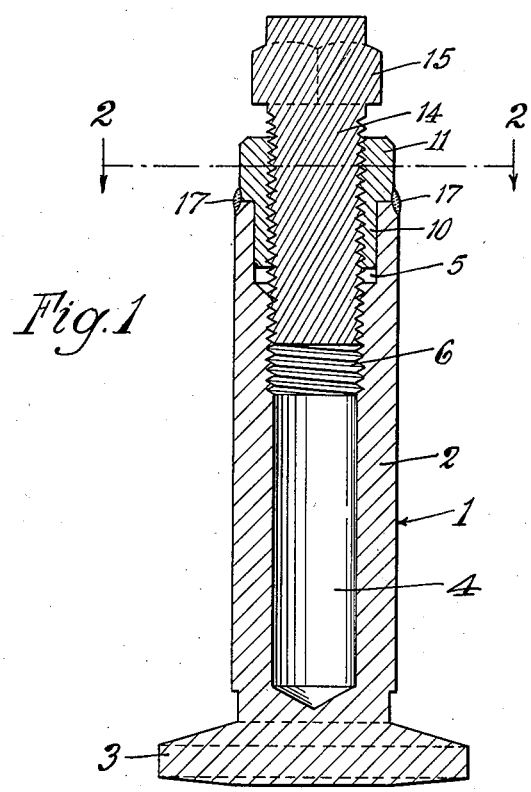
Fig. 1 is a section of my device.
Figure 2:
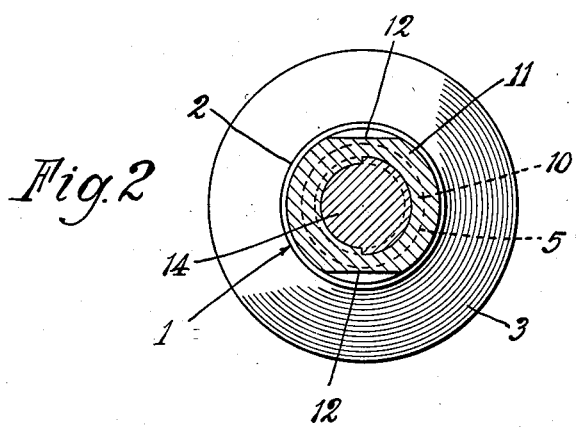
Fig. 2 is a section on the line 2—2 of Fig. 1.

Referring to the drawing, 1 generally indicates a one-piece or unitary valve tappet body having a barrel portion 2 of generally cylindrical shape and a mushroom head 3, herein shown as formed integrally therewith. The barrel 2 has a main bore portion 4 and an outer bore portion 5, herein shown as of slightly greater diameter. The upper or outer end of the main bore portion 4 is screw threaded as at 6.

10 indicates a tapped insert having a head portion 11 flattened as at 12. The insert 10 may be screwed on the tappet adjusting screw 14 with its head 15, and the screw 14 is then screwed into the threads 6. In this position the insert 10 has entered the reamed or enlarged bore 5 of the tappet cylinder 2. The tappet adjusting screw 14 may be screwed to its required overall length. When the longitudinal adjustment of the screw 14 in relation to the tappet is satisfactory, both the screw and the tappet body may be held stationary and the insert 10 with its head 11 may then be pulled up, creating a tension between the screw and the threads 6. This pulls the head 11 of the insert 10 down very tightly against the opposed end of the tappet body or cylinder 2.

The amount of pressure put at this stage determines the amount of torque or resistance to turning which the tappet adjusting screw 14 will thereafter have. It has been found that a torque of 35 inch pounds minimum is sufficient to keep the adjusting screw 14 from turning during the operation of an automobile motor.

When the insert 10 has been pulled up to the required tension it is fixed in position with relation to the tappet body or cylinder 2 by staking, arc welding, brazing or any other suitable means. I illustrate for example the employment of arc welding, the welded areas being illustrated as at 17. It will be understood that the purpose is merely to prevent relative rotation of the insert 10, 11 and the tappet body 2. The parts are locked against longitudinal movement by the adjusting screw 14, and the means of fastening need be only enough to prevent the above mentioned relative movement.

When the assembly above described is completed, there is a definite constant torque between the tappet body 2 and the insert 10, 11. This is maintained through the life of the tappet and does not change with adjustment. Fine adjustments are possible as no locking is required which would alter the accuracy of adjustment.

The tappet adjusting screw is made of any suitable material which is not indented by the action of the valve stem on its head. It is also of such material that it will not take a permanent set due to the tension put upon it by the action between the threads 6 and the insert 10. Concentricity between the tappet adjusting screw 14 and the barrel 2 of the tappet is not altered by the action of any lock nut. It is dependent only upon the accuracy of the tapping. The insert 10, 11 and the tappet body 2 are made of material which may be suitably treated to withstand the pounding to which the assembly as a whole is subjected in the course of its normal use in a motor.

One advantage of the above assembly is that it is possible to assemble the tappet 2, the insert 10, 11 and the screw 14 prior to the heat treating operation. After the initial assembly has been completed, and before applying the final tension, the tappet as a unit can be heat treated. During heat treating, scale is thereby kept out of the threads, and a fine fit is assured. After heat treatment, the proper required tension may be given to the insert 10 by rotating it in relation to the screw 14, and thereafter the securing means 17 or their equivalent may be applied and the device is then complete.

Many advantages of the above assembly and procedure will be apparent. The proper flanks of the threads of the screw are in contact with the opposed flanks of the tappet screw threads. The alignment of the parts is correct and accurate concentricity between the tappet 2 and the screw 14 is obtained, dependent only upon the accuracy of the tapping. Employment of any separate locking nut is avoided and the number of wrenches necessary for the adjusting operation is reduced. And finally, once the parts are set, the tappet assembly has a constant torque, which stays constant for the life of the tappet.

It will be realized that whereas I have described and illustrated a practical and operative device, nevertheless many changes may be made in the size, shape, number and disposition of parts without departing from the spirit of my invention. I therefore wish my description and drawing to be taken as in a broad sense illustrative or diagrammatic, rather than as limiting me to my precise showing.

It will be understood for example that when in the claims I describe the insert 11 as welded to the body tappet 2, I wish the term to be interpreted with sufficient breadth to include brazing, soldering or otherwise maintaining a metallically continuous bond between the two parts.

I claim:

1. In a tappet assembly, a hollow open-ended tappet body, having a screw threaded portion adjacent its open end, the bore of the tappet body between said threaded portion and the open end having an inner diameter substantially in excess of the diameter of said threaded portion, a tapped insert including a portion abutting against the outer end of the tappet body, and a portion of reduced diameter conforming generally to said bore portion of increased diameter, and a tappet adjusting screw, the threads of which are adapted for simultaneous engagement with the threads of said tapped insert and the threads of said tappet body, the threads of the adjusting screw in contact with the threaded bore portion of the tappet body and the threaded bore portion of the insert being in stressed relation, said insert being positively secured against rotation in relation to said tappet body.

2. In a tappet assembly, a hollow open-ended tappet body, having a screw threaded portion adjacent its open end, the bore of the tappet body between said threaded portion and the open end having an inner diameter substantially in excess of the diameter of said threaded portion, a tapped insert including a portion abutting against the outer end of the tappet body, and a portion of reduced diameter conforming generally to said bore portion of increased diameter, and a tappet adjusting screw, the threads of which are adapted for simultaneous engagement with the threads of said tapped insert and the threads of said tappet body, the threads of the adjusting screw in contact with the threaded bore portion of the tappet body and the threads of the tapped insert being in stressed relation, said tapped insert being fixedly secured to the opposed end of the tappet body.

3. In a tappet assembly, a hollow open-ended tappet body, having a screw threaded portion adjacent its open end, the bore of the tappet body between said threaded portion and the open end having an inner diameter substantially in excess of the diameter of said threaded portion, a tapped insert including a portion abutting against the outer end of the tappet body, and a portion of reduced diameter conforming generally to said bore portion of increased diameter, and a tappet adjusting screw, the threads of which are adapted for simultaneous engagement with the threads of said tapped insert and the threads of said tappet body, the threads of the adjusting screw in contact with the threaded bore portion of the tappet body and the threads of the tapped insert being in stressed relation, said tapped insert being welded to the opposed end of the tappet body.

4. In a tappet assembly, a hollow generally tubular tappet body having a screw-threaded portion adjacent its open end, a tapped member mounted on and held against rotation in relation to said open end of the tappet body, a tappet adjusting screw, the threads of which are adapted for simultaneous engagement with the threads of said tappet body and the threads of said tapped member, the threads of the adjusting screw in engagement with the threads of said two members being in stressed relation, and means for positively securing said tapped member against rotation in relation to said tappet body, said adjusting screw being adapted to urge said tapped member against the open end of said tappet body, in response to said stressed relation between the portion of its threads in engagement with the tapped member and the tappet body.

5. In a tappet assembly, a hollow generally tubular tappet body having a screw-threaded portion adjacent its open end, a tapped member mounted on and held against rotation in relation to said open end of the tappet body, a tappet adjusting screw, the threads of which are adapted for simultaneous engagement with the threads of said tappet body and the threads of said tapped member, the threads of the adjusting screw in engagement with the threads of said two members being in stressed relation, and a welded connection between the tapped member and the tappet body of sufficient strength to prevent their relative rotation, said adjusting screw being adapted to urge said tapped member against the open end of said tappet body, in response to said stressed relation between the portion of its threads in engagement with the tapped member and the tappet body.

WEBSTER D. CORLETT